(12) United States Patent
Dadisho

(10) Patent No.: US 6,213,309 B1
(45) Date of Patent: Apr. 10, 2001

(54) TURRET FEED CONTROL APPARATUS FOR SORTING AND DISTRIBUTING ARTICLES IN A PROCESS SYSTEM

(75) Inventor: Edward W. Dadisho, Modesto, CA (US)

(73) Assignee: B & H Manufacturing Company, Inc., Ceres, CA (US)

( * ) Notice: Subject to any disclaimer, the term of this patent is extended or adjusted under 35 U.S.C. 154(b) by 0 days.

(21) Appl. No.: 09/302,616

(22) Filed: Apr. 30, 1999

(51) Int. Cl.$^7$ .................................................. B07C 5/00
(52) U.S. Cl. ........................ 209/523; 209/634; 209/905; 209/919; 198/450; 198/459.2
(58) Field of Search .................................. 209/522, 523, 209/524, 643, 903, 905, 919; 198/393, 443, 450, 459.2, 478.1

(56) References Cited

U.S. PATENT DOCUMENTS

| | | | |
|---|---|---|---|
| 4,003,277 | * 1/1977 | Oesterling | 198/450 X |
| 4,033,447 | 7/1977 | Heier | 198/441 |
| 4,045,944 | 9/1977 | Giori | 53/123 |
| 4,049,111 | * 9/1977 | Masterd | 198/734 X |
| 4,073,372 | 2/1978 | List | 198/341 |
| 4,467,908 | 8/1984 | Schneider | 198/441 |
| 4,651,879 | * 3/1987 | Harris et al. | 209/523 |
| 4,697,691 | 10/1987 | Zodrow et al. | 198/425 |
| 5,113,996 | 5/1992 | Francioni | 198/441 |
| 5,392,928 | * 2/1995 | Nickey et al. | 209/905 X |
| 5,529,191 | 6/1996 | Washeim | 209/523 |
| 5,615,761 | 4/1997 | Draghetti | 198/441 |
| 5,697,489 | 12/1997 | Deonarnine et al. | 198/464.4 |
| 5,882,474 | 3/1999 | Gomes et al. | 156/556 |

FOREIGN PATENT DOCUMENTS

1219172 * 3/1986 (SU) ...................................... 209/919

* cited by examiner

Primary Examiner—Tuan N. Nguyen
(74) Attorney, Agent, or Firm—Lariviere, Grubman & Payne, LLP (57) ABSTRACT

An article processing apparatus having a plurality of input conveyors directing articles into a work station and a single turret sorting mechanism. The work station processes articles while, simultaneously, unprocessed articles are fed into the turret sorting mechanism. The output of the work station is simultaneously fed into the turret sorting mechanism. The turret control mechanism engages articles fed to it using a gripper. The turret sorting mechanism rotates the articles until, in conjunction with a control system, the articles are released onto appropriate locations on a second set of conveyors. The second set of conveyors directs the unprocessed articles to a second work station (where the unprocessed articles are processed) and the articles processed by the first work station are directed to an output station. Once processed, the articles sent to the second work station are also directed to the output station where they are collected and prepared for further processing.

22 Claims, 7 Drawing Sheets

TURRET FEED CONTROL APPARATUS FOR SORTING AND DISTRIBUTING ARTICLES IN A PROCESS SYSTEM

TECHNICAL FIELD

This present invention is directed towards process machines for handling articles and transferring articles between a plurality of process lines. Most particularly, the invention relates to an apparatus for sorting and distributing lines of moving vessels from one process row to another process row.

BACKGROUND OF THE INVENTION

Figure 1:
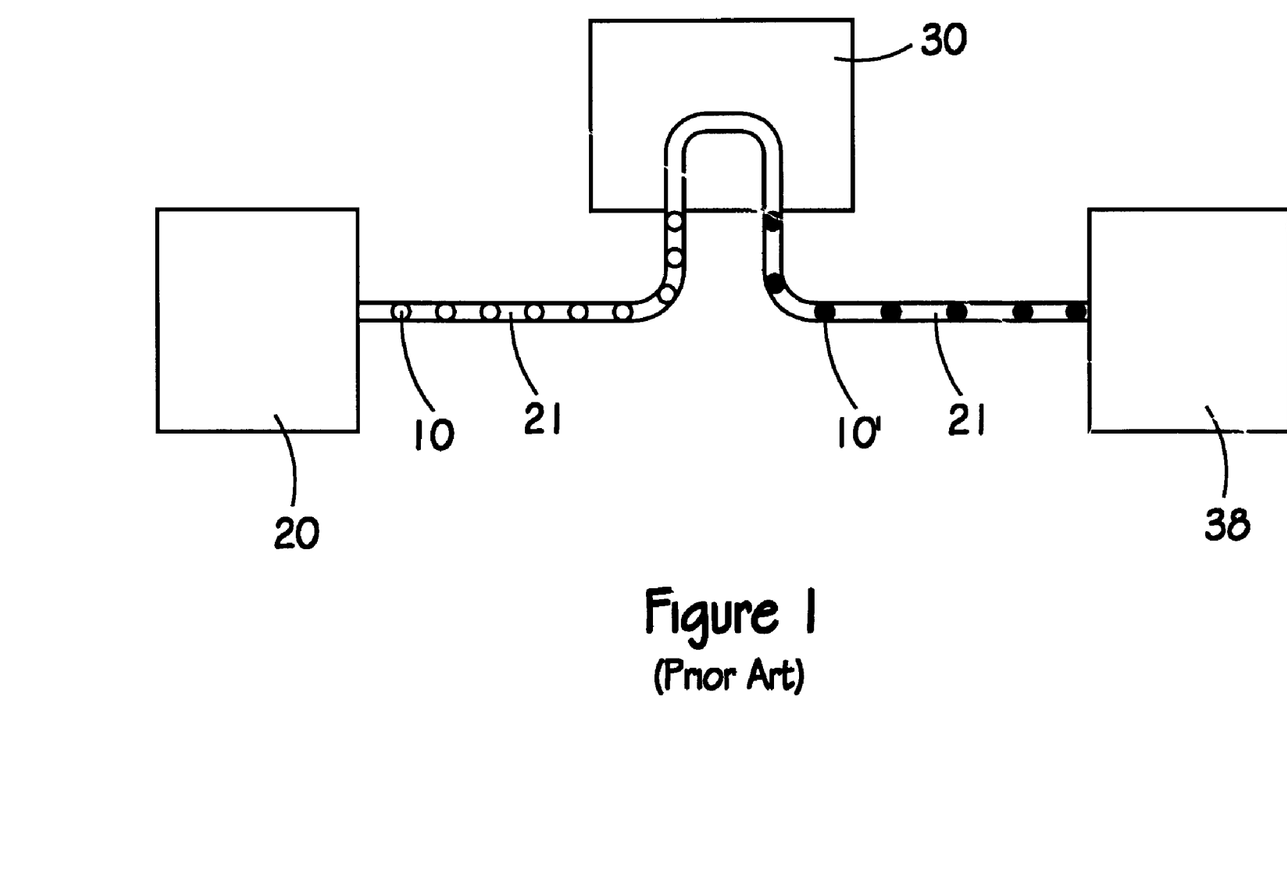
FIG. 1 is a plan view of a typical machine of the present art.

In the commercial processing of many different types of articles, such as bottles in a labeling plant, it is desirable to process numerous columns of articles at the same time. The word "article" is used herein as a generic term for any type of vessel, container, bottle, or other items processed by the invention. Ordinarily, articles (such as bottles) are processed on single conveyor lines through a single set of process stations resulting in a completed product. Such a system is shown in FIG. 1. An input station 20 feeds unprocessed articles 10 onto a single conveyor system 21 into a work station 30 (for example, a bottle labeling machine). The articles are processed 10' and conveyed out of the work station 30 on a conveyor system 21 to an output station 38 for further processing. A complete set of process stations (20, 30, 38) are needed to process a single lines of articles. This form of processing is slow, takes up a great deal of space, and in the event of a component or station malfunction, all processing ceases.

The present invention overcomes these difficulties by running many process lines through fewer process stations and using a single sorting mechanism to more efficiently distribute the articles under process to the various stations. This reduces total space needed and effectively increases process efficiency by requiring fewer operators, fewer machines, and easier use.

SUMMARY OF THE INVENTION

In accordance with the principles of the present invention, there is provided a machine for the efficient processing of articles using a plurality of work stations. The machine of the present invention makes possible the simultaneous high speed use of two or more work stations. This reduces the number of operators necessary to operate the machine. Additionally, due to the compactness of the machine of the present invention more articles may be processed per unit of floor space, thereby increasing productivity. Moreover, due to a sorting feature, the machine is less susceptible to "down time" caused by malfunctioning work stations.

The machine of the present invention uses an input station which provides columns of articles to a conveyor system. The input station arranges the articles in first feed and stand-by columns which are provided to a first conveyor system. The articles of the first feed columns are fed directly into a first set of work stations for processing. After processing, a first outflow conveyor directs the processed articles to a turret sorting mechanism. Simultaneously, the first conveyor system conducts the articles of the stand-by columns directly to the turret sorting mechanism.

The turret sorting mechanism engages the stand-by and first outflow column articles and secures them using a releasable gripping means. The turret rotates the articles in a carousel-like manner and in concert with sensors and control means releases the articles onto a second conveyor system. The articles are released from the turret sorting mechanism in second feed columns of unprocessed articles and exit columns of processed articles. The second conveyor system feeds the unprocessed articles of the second feed column into a second set of work stations for processing. After processing, the articles of the second set of work stations are directed by a second outflow system to an output station where they are collected for further processing. Simultaneously, the already processed articles of the exit column are conveyed by the second conveyor directly to the output station for further processing.

In accordance with the principles of the present invention, there is provided a novel and improved article processing machine which is smaller than previous machines, reduces operation costs, has high process speeds, requires fewer operators, and is more flexible in use than previous machines.

Other features of the present invention are disclosed or apparent in the section entitled: "DETAILED DESCRIPTION OF THE INVENTION."

BRIEF DESCRIPTION OF THE DRAWINGS

For a fuller understanding of the present invention, reference is made to the accompanying drawings, which detail various aspects of the invention. In the drawings.

Like reference numbers refer to the same or equivalent parts of the invention throughout the several figures of the drawings.

DETAILED DESCRIPTION OF THE INVENTION

Figure 2:
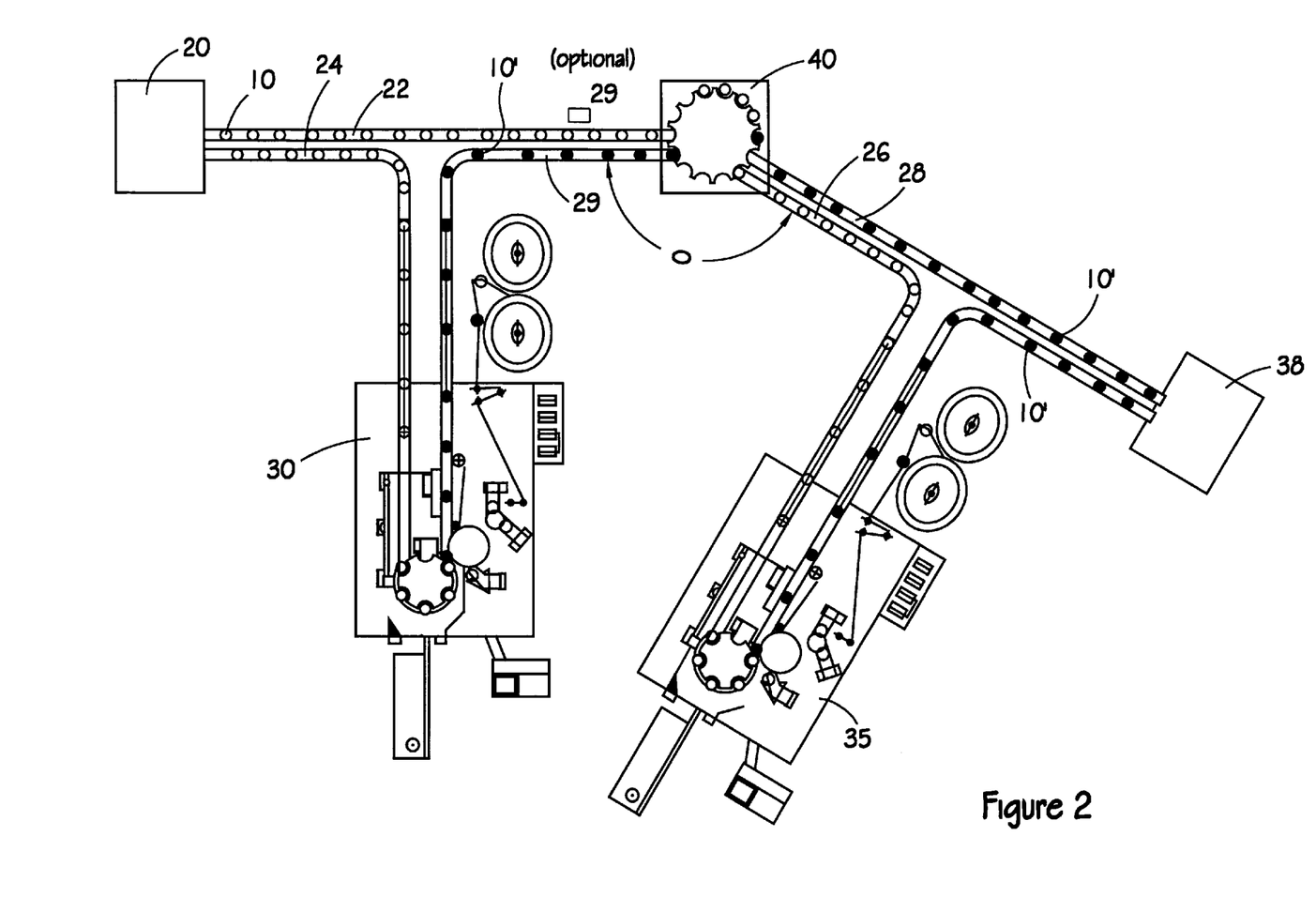
FIG. 2 is a plan view of one embodiment of a machine in accordance with the present invention.

An embodiment of an apparatus for processing articles in accordance with the principles of the present invention is depicted in FIG. 2. An input station 20 arranges articles 10 in columnar rows and delivers them to a first conveyor system (22, 24). The first conveyor system (22, 24) may be a single conveyor or a pair of side-by-side conveyors. The conveyors may include airveyors or chain driven conveyor systems such as those manufactured by Simplimatic Engineering Co. of Lynchburg, Va.

The input station 20 arranges the articles in a first feed column on a first feed conveyor 24 and a stand-by column on a stand-by conveyor 22. The first feed conveyor 24 feeds articles 10 into a first work station 30. By way of example, the articles 10 may be bottles and the work station 30 may be a labeling machine for labeling bottles. A typical example of such a machine is a BH 8000 produced by B & H Labeling Systems of Ceres, Calif.

Once the articles 10 are processed by the machine 30, they exit the machine 30 on a first outflow system 27 which is typically the same as the first feed conveyor. These processed articles 10' are conveyed by a first outflow system 27 to a single turret sorting mechanism 40. Simultaneously, the unprocessed articles 10 of the stand-by column are transported by the stand-by conveyor 22 directly to the turret sorting mechanism 40.

The turret sorting mechanism 40 collects and engages the articles (10, 10') and redistributes the articles (10, 10') onto a second conveyor system (26, 28). The second conveyor system (26, 28) may be a completely separate conveyor system from the first conveyor system (22, 24). Alternatively, the second conveyor system (26, 28) may simply be a longer version of the first conveyor (22, 24) having two contiguous segments. The turret sorter 40 being positioned between a first and a second segment with the turret sorter 40 merely switching the articles (10, 10') from one conveyor 22 to another conveyor 24.

Figure 3:
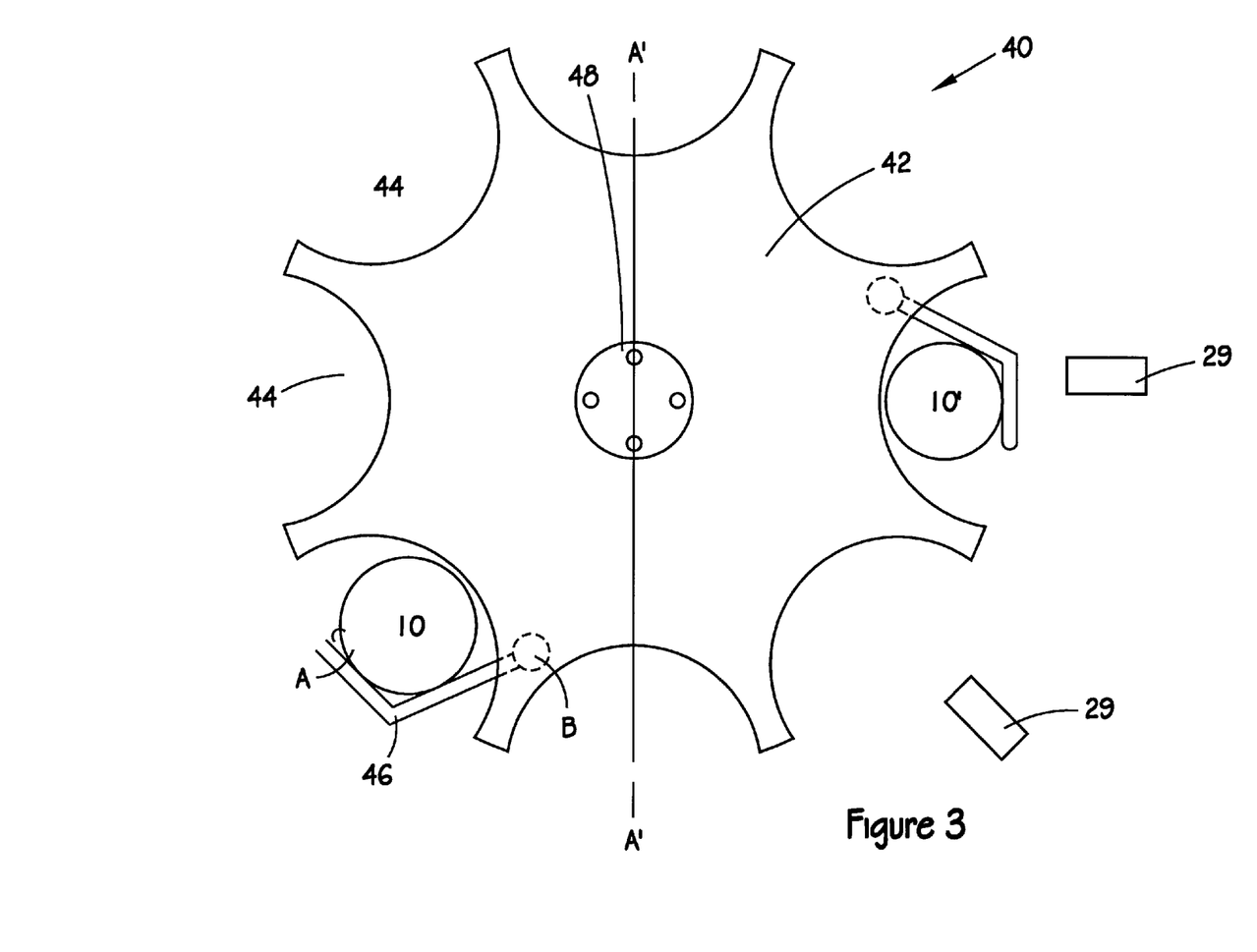
FIG. 3 is a plan view of an embodiment of a turret sorting mechanism.

The process of sorting and redistribution of articles is accomplished by the turret sorting mechanism 40 in concert with one or more sensors 29 and a controller 90 (not shown). The combination of the sensor 29 and a controller 90 providing a control system (29, 90). The system may be controlled by a variety of methods, but sensors 29 and controller 90 provide an optimal method. The sensors 29 may be located at various locations on the apparatus. For example, as shown in FIG. 2, sensors 29 may be located on the first conveyor (22, 24) after the articles 10 pass through the first work station 30. Alternatively, the sensor 29 may be located in the turret sorting mechanism 40. As shown in FIG. 3, one or more sensors 29 may be mounted on the body of the turret sorting mechanism 40, positioned to sense articles (10, 10') as they are cycled through the turret sorting mechanism 40. Other arrangements and locations are possible. The sensors 29 provide selection and timing information which is used by the controller 90 of the control system to determine when the turret sorting mechanism 40 releases articles (10, 10') onto the second conveyor system (26, 28). The sensors 29 may be used to detect a wide variety of parameters. For example, the sensors 29 can be used to detect whether or not an article has been processed by a work station 30 (for example, if an article has been labeled). The sensors 29 may be used to sense different sizes, shapes, and colors of the articles. The sensors 29 provide timing signals which are used by the controller 90 to control when the turret sorting mechanism 40 releases articles (10, 10').

The Turret Sorting Mechanism

Figure 4:
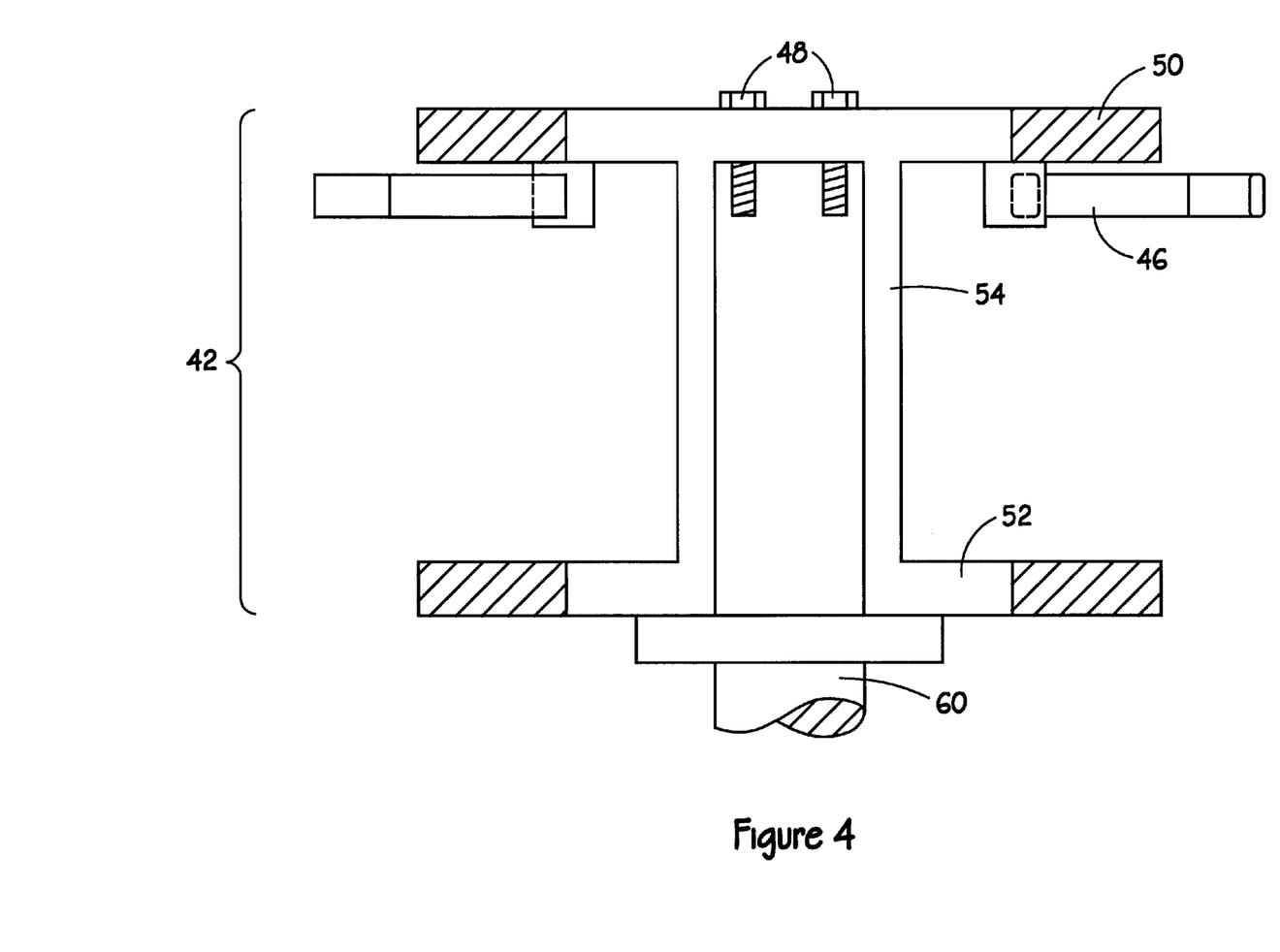
FIG. 4 is a cross-section view of the embodiment of the turret sorting mechanism shown in FIG. 3.
Figure 5A:
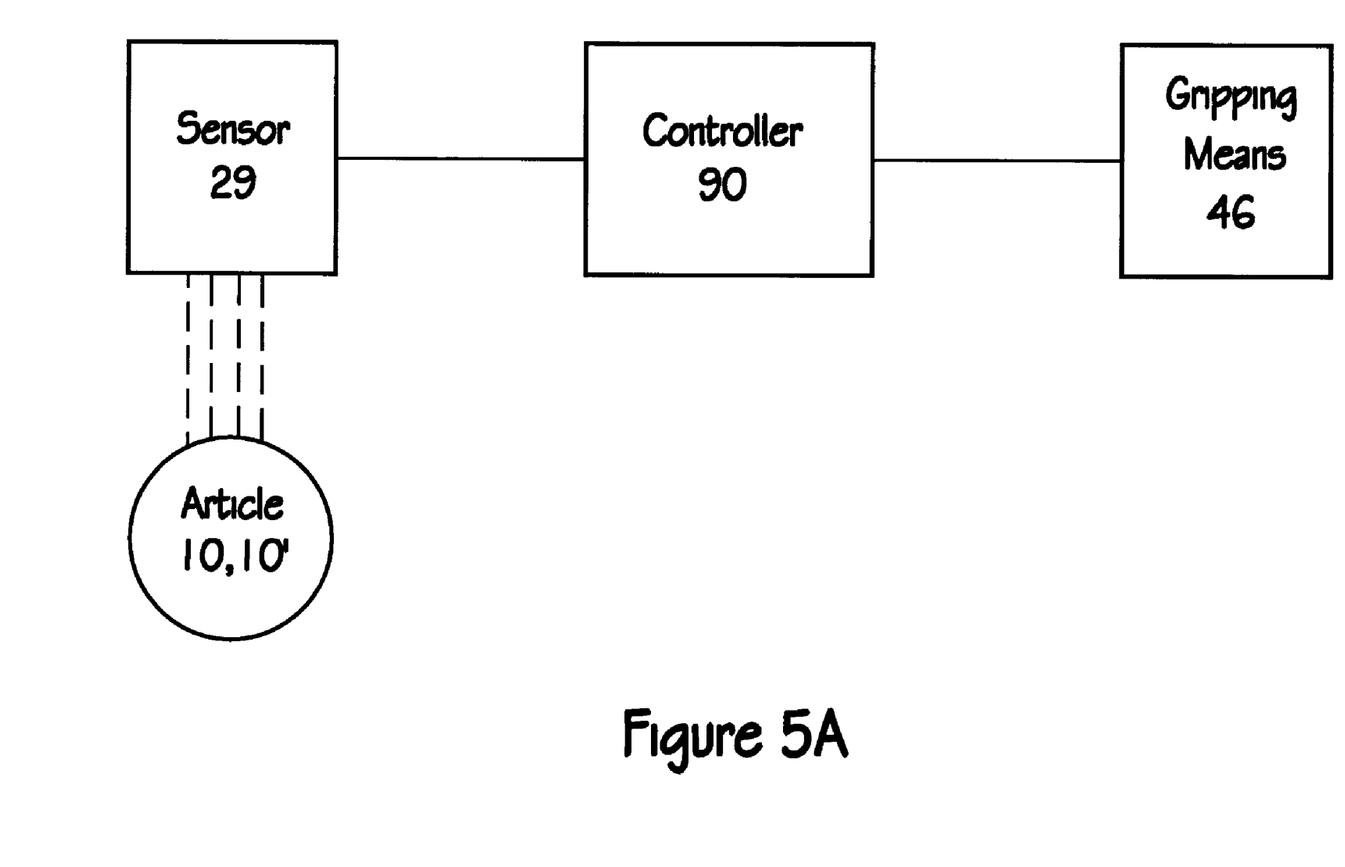
FIG. 5A is a block diagram of a basic control scheme for use with the machine of the present invention.
Figure 5B:
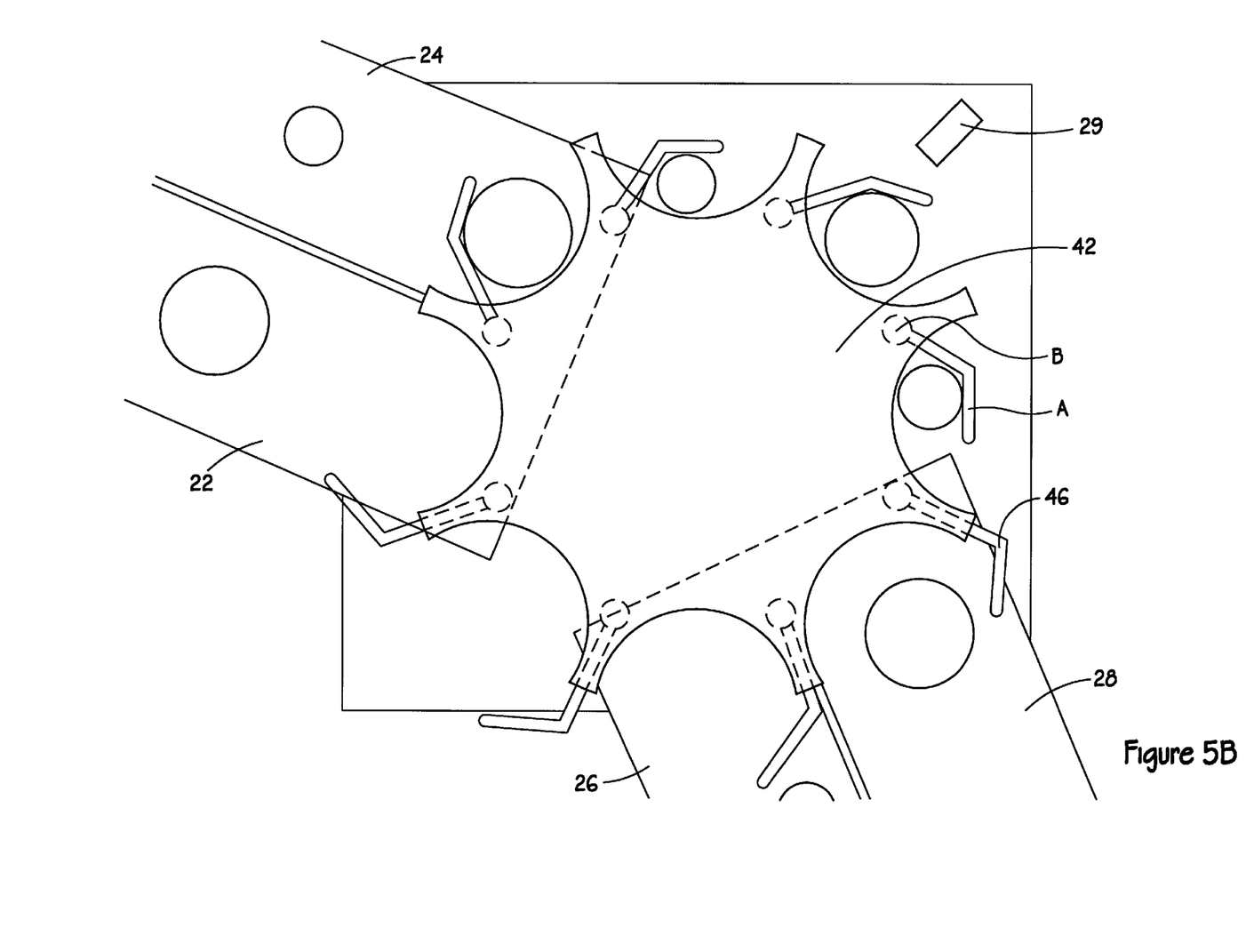
FIG. 5B is a close-up plan view of a turret sorting mechanism used with the embodiment shown in FIG. 2.

FIGS. 3, 4, and 5B describe a turret sorting mechanism 40. In general, the turret sorting mechanism 40 includes a rotor assembly 42, drive shaft 60 and a drive means (not shown). The turret sorting mechanism 40 comprises a generally circular rotor 42 having article engaging recesses 44 circumferentially spaced about the outer periphery of the rotor assembly 42. As shown in FIG. 5B, articles (10, 10') are guided into the recesses 44 by the first conveyor systems (22, 24). Each recess 44 has a releasable gripping means 46 for releasably engaging an article (10, 10') as it is fed into the recesses 44 by the conveyors (22, 24). The embodiment of FIG. 5B also shows sensors 29 positioned to sense articles (10, 10') in the recesses 44. The gripping means 46 of FIGS. 3 and 5B is shown as a single gripping arm A which swivels about a pivot B to secure the article (10, 10'). Other gripping means 46 may utilize two jaws to grip the articles. Alternatively, a vacuum gripping means may be used to releasably secure articles 10, 10' (for example, the vacuum gripping means shown in U.S. Pat. No. 5,882,474, Issue Date: Mar. 16, 1999).

Alternatively, other gripping devices known to those with ordinary skill may be used. As shown in FIG. 3, the recess 44 gripping means 46 combination can be used to secure articles (10, 10') of varying sizes and shapes using the same size rotor assembly 42. The turret sorting mechanism 40 is turned in a carousel-like manner by a drive means (not shown). Typically, the drive means is an electric motor which drives a shaft 60 which is secured to the rotor 42 (typically using bolts 48). The speed of the shaft 60 is typically controlled by a remote controller means (not shown). By regulating the engagement and disengagement of the gripping means 46, a control system (including sensors 29 and a controller 90) facilitates the sorting and transfer of articles (10, 10').

Typically, one or more sensors 29 are positioned to sense articles (10, 10') during processing. A typical sensor is a color differentiated sensor such as that produced by Telemechanique of Rueil Malmaison, France. The sensors 29 may be advantageously positioned on the turret sorting mechanism 40 itself as shown in FIG. 3. For example, the sensors 29 may be located on the turret sorting mechanism 40. This allows the sensors 29 to detect the articles as they enter the recesses 44 of the turret sorting mechanism 40. The sensor information is then sent to the controller 90 which opens and closes the gripping means 46 to secure or release the articles (10, 10') at the appropriate places. Alternatively, the sensors 29 may be placed adjacent to the conveyor systems (22, 24) to sense the articles as they pass. A different embodiment features individual sensors 29 mounted on the rotor assembly 42 such that each recess 44 features a sensor 29 which detects articles (10, 10') as they enter the recesses 44. The sensors 29 provide timing information to a controller 90 (not shown) which controls the disengagement of the gripping means 46. The disengagement of the gripping means 46 is timed to release the articles (10, 10') onto the appropriate conveyor system. A typical controller 90 is a Mitsubishi FX2NPLC processor. Typically, the sensors 29 are electrically connected to the controller 90 with the sensor 29 providing selection and timing information by an electrical signal. However, as disclosed below, simple mechanical control systems are contemplated by the present invention.

FIG. 4 shows a cross-section view of a typical turret sorting mechanism 40 (e.g. FIG. 2 along the A'—A' axis). A typical turret sorting mechanism 40 includes upper and lower turret plates 50, 52. Each includes a plurality of circumferentially spaced article engaging recesses 44. Although eight recesses 44 are shown in FIGS. 3 and 5B, the number of recesses 44 can be any number. The upper and lower turret plates 50, 52 are in a spaced apart relationship to each other. They can be fixedly secured in this relationship by any number of means known to those with ordinary skill in the art. They can be welded to a shaft 54 as shown. Alternatively, the turret plates 50, 52 may be riveted or bolted to the shaft 54. The turret plates 50, 52 may also be secured and spaced apart by spacer fasteners. Many methods suggest themselves to one with ordinary skill in the art.

Although the shape, size, and presence of gripping means 46 allow the recesses 44 to engage a wide variety of articles using the same rotor assembly 42, it sometimes becomes necessary to change rotor assemblies 42 to accommodate different articles; for instance, if the invention is used to process square articles. Securing bolts 48 enable facile removal and securement of the rotor assembly 42 from and to a drive shaft 60, the drive shaft 60 being operationally connected to a drive means (not shown) for impelling rotary motion to the turret sorting mechanism 40. Once removed, a different rotor assembly 42 may be replaced to process different articles.

FIG. 5A is a simple block diagram showing the basic control system of the turret sorting mechanism 40. An article (10, 10') is sensed by one or more sensors 29. The sensors 29 may be used to detect a number of parameters including, but not limited to, whether the article (10, 10') is labeled or unlabeled, whether the article is full or empty, or what color the article is. After being sensed the article continues processing. The sensor information is sent to the controller 90 which controls when the gripping means 46 disengages the article from the turret sorting mechanism 40.

The embodiment shown in FIG. 5B provides an example of how the turret sorting mechanism 40 sorts and distributes articles. The stand-by conveyor 22 and feed conveyor 24 supply unprocessed articles 10 and processed articles 10' to the turret sorting mechanism 40. The turret sorting mechanism 40 engages and secures the articles (10, 10') with a gripping means 42. The turret sorting mechanism 40 rotates in a carousel-like fashion, releasing the articles onto a second conveyor system (26, 28). The unprocessed articles 10 are released onto a second feed conveyor 26 while the processed articles 10' are released onto an exit conveyor 28.

The sensors 29 in combination with the controller 90 facilitate the accurate sorting and releasing of articles (10, 10') from the turret sorting mechanism 40 at the appropriate time and place. The controller 90 may be used to regulate the opening and closing of the gripping means 46. For example, referring to FIGS. 2 and 6, sensors 29 are located to sense articles 10, 10' on the stand-by and outflow conveyors 22, 24 after the articles 10' have been processed by the first work station 30. The sensors 29 may be used to detect whether articles (10, 10') have been processed or not. The sensor 29 produces timing information which is processed by controller 90 of the control system. The controller 90 times the disengagement of the gripping means 46 such that, for example, processed articles 10' will be released onto the exit conveyor 28. The control systems can be more complex, regulating the turret 40 rate of rotation or the various conveyor speeds. Additionally, the sensors 29 may be used to sense other characteristics such as different article size, color, or shape, etc. This allows the turret to differentiate between differently sized articles and sort them appropriately and distribute them to the desired conveyors. This allows two different sized articles to be fed into the apparatus and yet be processed separately by different machines.

Again referring to FIG. 2, the control system (29, 90) and the turret sorting mechanism 40 work in concert to accurately sort and feed articles. For example, the input station 20 arranges the articles 10 in columns on the feed and stand-by conveyors (24, 22). The feed conveyor 24 directs the article through the first work station 30 where it exits onto the first outflow conveyor 24. The processed articles 10' and unprocessed articles 10 are sensed by the sensors 29 and sensor information is processed by the controller 90 which sends information to the turret sorting mechanism 40. Both the processed and unprocessed articles (10', 10) are engaged by the recesses 44 and gripping means 46 of the turret sorting mechanism 40. The articles (10, 10') are rotated into position by the turret sorting mechanism 40. Based on the timing information provided by the sensors 29, the controller 80 signals the turret sorting mechanism 40 to release the processed article 10' onto the exit conveyor 28 and the unprocessed article 10 onto the second feed conveyor 26 where it can be fed into the second work station 35 for processing.

Preferred Embodiment

Figure 6:
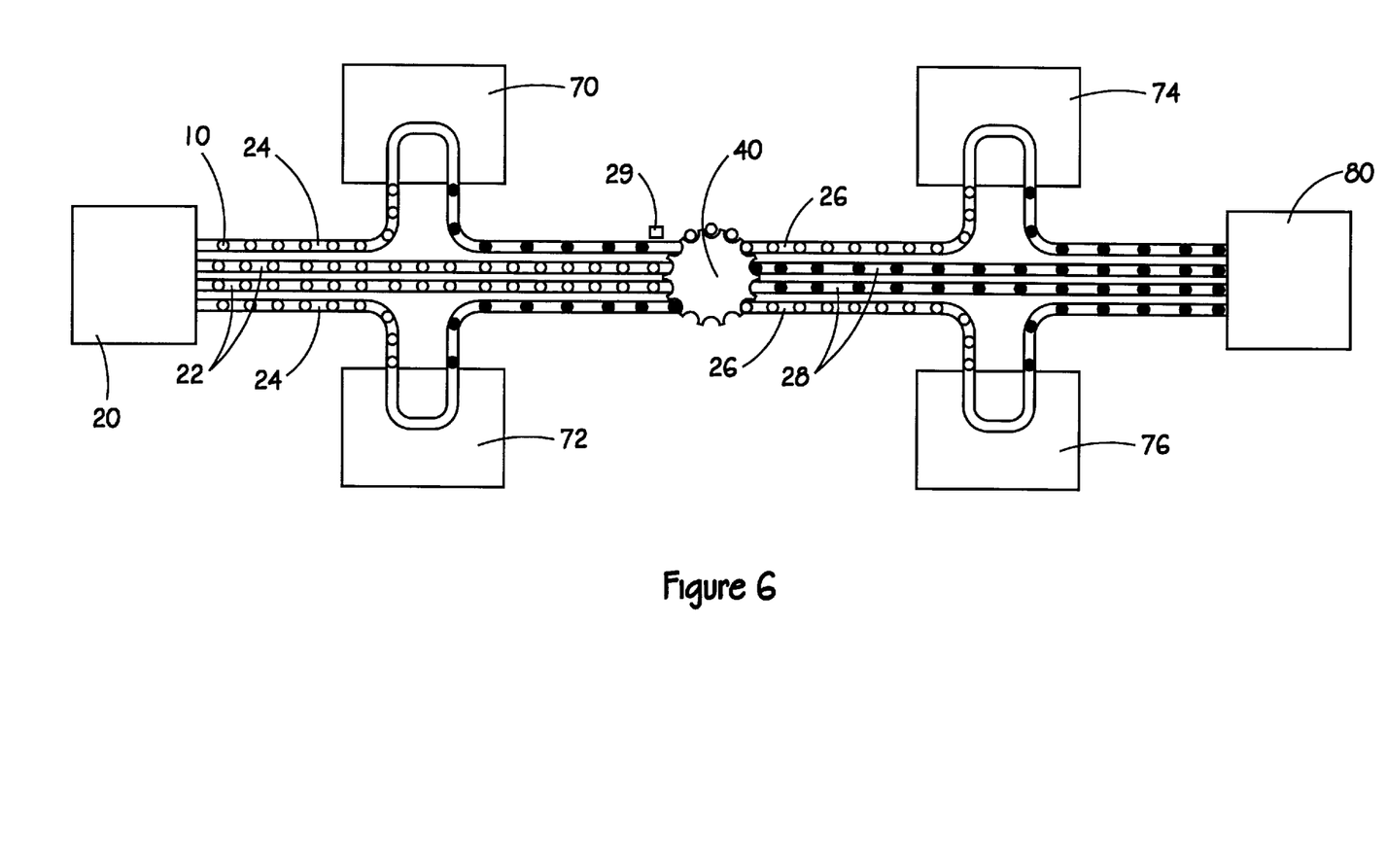
FIG. 6 is a plan view of an embodiment of the present invention.

The principles of the present invention can be expanded into a number of specific different configurations. A preferred embodiment is diagrammatically illustrated in FIG. 6. The apparatus of FIG. 6 uses four work stations (70, 72, 74, 76) but only requires a single input station 20, a single output station 80, and a single turret sorting mechanism 40. This saves the need for several input and output stations and therefore requires fewer operators. The apparatus of FIG. 6 is used to label (or delabel) bottles. "Bottles" as used herein refers to bottles, cans, receptacles, or any other type of container. An input station 20 arranges and directs columns of unlabeled articles 10 onto a first conveyor system (22, 24). The first conveyor system has stand-by conveyors 22 and initial feed conveyors 24. Satisfactory conveyors are manufactured by Simplimatic Engineering Co. of Lynchburg, Va. The initial feed conveyors 24 direct columns of unlabeled articles 10 into initial labeling stations 70, 72. A satisfactory labeling station is a BH 8000 produced by B & H Labeling Systems of Ceres, Calif. The labeled containers 10' are conveyed out of the labeling stations (70, 72) to a turret sorting mechanism 40, where the gripping means 46 engages the articles (10, 10'). Simultaneously, the unlabeled articles 10 are conveyed directly to the turret sorting mechanism 40 by the stand-by conveyors 22. These articles 10 are also engaged and secured by the turret sorting mechanism 40.

The sensors 29 may be used differentiate the labeled articles 10' from the unlabeled 10 articles. The sensors 29 produce timing information which is used by the controller 90 (not shown) of the turret sorting mechanism 40 to regulate the release of the gripping means 46 so that the labeled and unlabeled articles 10', 10 are distributed to the appropriate conveyor systems 26, 28.

The controller 90 causes the turret sorting mechanism 40 to release the labeled articles 10' onto exit conveyors 28, which directs the articles 10' to an output station 80 which collects the labeled articles 10' for further processing. Meanwhile, the controller 90 causes the turret sorting mechanism 40 to direct the unlabeled articles 10 onto a second set of feed conveyors 26, which feed these articles into a second set of labeling machines 74, 76. These labeling machines may be the same or a different type than the first set 70, 72.

Both the embodiments illustrated in FIGS. 2 and 6 may use an alternative sorting method. In this method, the input station 20 provides the articles 10 in columns, at prescribed intervals, to the stand-by and first feed conveyors 22, 24 and regulates conveyor speed. By regulating the conveyor 22, 24 speed and regulating the labeling machine 70, 72 process speeds, the intervals between the articles 10, 10' may be maintained. As a consequence, the space between articles 10, 10' is constant and may be timed. By timing the rotation rate of the turret sorting mechanism 40 to coincide with the rate at which the articles 10, 10' reach the turret sorting mechanism 40, the articles may be neatly and systematically collected by the recesses 44 of the turret sorting mechanism 40. By making use of the uniform rate at which the articles 10, 10' reach the turret sorting mechanism 40, the gripping means 46 can be systematically engaged or disengaged. This allows the articles 10, 10' to be secured in the turret sorting mechanism 40, rotated, and released at the appropriate time and place (i.e., on the correct conveyor belt). The engaging and disengaging of the gripping means 46 may be actuated through the use of a mechanical cam which is synchronized to the rate of turret sorting mechanism 40 rotation, bottle interval, rate of conveyor 22, 24 speed, and location of the second set of conveyors 26, 28. To accommodate different speeds and rates, a variety of substitute cams are used. As such, the cams function as a controller 90. Such cam systems are known to those having ordinary skill in the art. This has the advantage of not requiring complicated and more expensive sensor systems to control article engagement, sorting, loading and unloading.

Arrangements having several conveyor systems operating from a single input station 20 have additional practical operational advantages. Referring to FIG. 1, for example, if the work station 30 malfunctions, the machine is completely out of order until the work station 30 is repaired.

With the present invention this is not the case. Referring to FIG. 2, if one of the work stations (for example, the first work station 30) malfunctions, the invention can still be used. The articles 10 may all be processed by proceeding along stand-by conveyor 22 to the turret sorting mechanism 40 where they are distributed to second feed conveyor 26 and fed into the second work station 35 for processing. Although the invention runs a reduced capacity, it is not completely useless as are current systems.

The present invention has been particularly shown and described with respect to certain preferred embodiments and features thereof. However, it should be readily apparent to those of ordinary skill in the art that various changes and modifications in form and detail may be made without departing from the spirit and scope of the inventions as set forth in the appended claims. It should especially be noted that the number of conveyor systems and work stations may be widely varied. Additionally, the orientation of the conveyor systems with regard to each other may also be varied without departing from the principles of the invention. The inventions illustratively disclosed herein may be practiced without any element which is not specifically disclosed herein.

We claim:

1. A turret sorting mechanism for sensing, sorting, and distributing articles in a process apparatus, said mechanism comprising:
   a) a plurality of input conveyors for essentially synchronously transporting articles;
   b) at least one sensor for detecting and differentiating articles transported by each of said input conveyors and providing sensor information;
   c) a turret sorting mechanism for receiving said articles comprising:
      A rotationally driven, generally circular rotor assembly;
      said rotor assembly having circumferentially spaced apart recesses;
      each of said recesses including a gripping means for engaging said articles as they enter said recesses; and
      a controller for actuating said gripping means to engage said articles when they enter said recesses and selectively disengage said articles in conjunction with said sensor information; and
   d) a plurality of output conveyors for transporting said selectively disengaged articles out of said recesses.

2. An apparatus as in claim 1, wherein said sensor includes at least one sensor positioned to sense said articles prior to entering the recesses of said rotatable turret sorting mechanism.

3. An apparatus as in claim 1, wherein said sensors for detecting and differentiating articles are positioned at each of said recesses to sense said articles as they enter the recesses of said rotatable turret sorting mechanism.

4. An apparatus as in claim 1, wherein said generally circular rotor assembly is readily interchangeable with different rotors assemblies, said rotor assemblies being optimized to accommodate articles having different sizes and shapes.

5. A turret sorting mechanism for sensing, sorting and distributing articles in a process apparatus, said mechanism comprising:
   a) a plurality of input conveyors for essentially synchronously transporting articles;
   b) at least one sensor for detecting and differentiating articles transported by each of said input conveyors and providing sensor information:
   c) a turret sorting mechanism for receiving said articles comprising:
      a rotationally driven, generally circular rotor assembly;
      said rotor having circumferentially spaced apart recesses;
      each of said recesses including a gripping means for engaging and disengaging said articles;
   d) a controller for receiving said sensor information and controlling the actuation of said gripping means in conjunction with said sensor information to selectively engage and disengage said articles from said recesses; and
   e) a plurality of output conveyors for transporting said selectively disengaged articles out of said recesses.

6. A turret sorting mechanism as in claim 5, wherein said at least one sensor for detecting and differentiating articles are located to detect said articles as they enter said turret sorting mechanism.

7. A turret sorting mechanism as in claim 6, wherein said at least one sensor for detecting and differentiating articles are located in each of said recesses.

8. A turret sorting mechanism as in claim 5, wherein said at least one sensor for detecting and differentiating articles are located to detect said articles before they enter said turret sorting mechanism.

9. A turret sorting mechanism as in claim 5, wherein said gripping means for engaging and disengaging said articles comprises a mechanical gripping means.

10. A turret sorting mechanism as in claim 5, wherein said gripping means for engaging and disengaging said articles comprises a vacuum gripping means.

11. An apparatus for processing and sorting articles; comprising:
   a) an input station for arranging articles into one or more first feed columns and one or more stand-by columns;
   b) a conveyor system for receiving and transporting said first feed and stand-by columns, said conveyor system having a first segment and a second segment;
   c) one or more first work stations for receiving and processing the articles of said one or more first feed columns from the first segment of said conveyor system;
   d) a rotatable turret sorting mechanism for receiving and sorting the processed articles from the first segment of said conveyor system and the articles of the one or more stand-by columns from the first segment of said conveyor system, said turret having a gripping means for engaging and disengaging said articles and said processed articles;
   e) a control system for controlling the engaging and disengaging of said articles as they are received onto and released from said turret, said control system, in concert with said turret, releasing said articles in one or more second feed columns and said processed articles in one or more exit columns onto said second segment of said conveyor system;
   f) one or more second work stations for receiving and processing the articles of said one or more second feed columns from said second segment of the conveyor system; and g) an output station for receiving processed articles from said second segment of the conveyor system.

12. An apparatus as in claim 11, wherein said conveyor system having a first segment and a second segment comprise a single contiguous conveyor system.

13. An apparatus as in claim 11, wherein said one or more first work stations (c) comprise labeling machines.

14. An apparatus as in claim 11, wherein said gripping means for engaging and disengaging comprises a mechanical gripping means.

15. An apparatus as in claim 11, wherein said gripping means for engaging and disengaging comprises a vacuum gripping means.

16. An apparatus as in claim 11, wherein said control system for controlling the engaging and disengaging of said articles as they are received onto and released from said turret includes at least one sensor for sensing said articles and providing timing and selection information to a controller for controlling the engaging and disengaging of said articles in response to said timing and selection information.

17. An apparatus as in claim 16, wherein said at least one sensor is positioned to sense said articles prior to reaching said rotatable turret sorting mechanism.

18. An apparatus as in claim 16, wherein said at least one sensor is positioned to sense said articles as they are received by said rotatable turret sorting mechanism.

19. An apparatus for processing and sorting articles; comprising:

a) an input station for arranging articles into one or more first feed columns and one or more stand-by columns;

b) a first conveyor system for receiving and transporting said first feed and stand-by columns;

c) one or more first work stations for receiving and processing the articles of said one or more first feed columns from said first conveyor system;

d) one or more first outflow systems for receiving the one or more first feed columns, after processing, from the one or more first work stations;

e) a rotatable turret sorting mechanism for receiving and sorting the processed articles from the one or more first outflow systems and the articles of the one or more stand-by columns from the first conveyor system, said turret having a gripping means for engaging and disengaging said articles and said processed articles;

f) a control system for controlling the engaging and disengaging of said articles as they are received onto and released from said turret, said control system, in concert with said turret, releasing said articles in one or more second feed columns and said processed articles in one or more exit columns;

g) a second conveyor system for receiving and transporting said second feed and exit columns after sorting and release by the turret sorting mechanism;

h) one or more second work stations for receiving and processing the articles of said one or more second feed columns from said second conveyor system;

i) one or more second outflow systems for receiving and transporting the one or more second feed columns, after processing by the one or more second work stations; and j) an output station for receiving processed articles from said second conveyor system and said second outflow system.

20. An apparatus as in claim 19, wherein said control system for controlling the engaging and disengaging of said articles as they are received onto and released from said turret includes at least one sensor for sensing and differentiating said articles and providing timing and selection information to a controller for controlling the engaging and disengaging of said articles in response to said timing and selection information.

21. An apparatus as in claim 20, wherein said at least one sensor comprises a color differentiated sensor.

22. An apparatus as in claim 19, wherein said control system for controlling the engaging and disengaging of said articles as they are received onto and released from said turret includes arranging said articles of said one or more first feed columns and said one or more stand-by columns in an evenly spaced fashion and using a cam to control the rotatable turret sorting mechanism, the cam being chosen to selectively engage and disengage said articles, releasing said articles in one or more second feed columns and said processed articles in one or more exit columns.

* * * * *